US012741610B2

(12) United States Patent
Ruiz Moreno et al.

(10) Patent No.: US 12,741,610 B2
(45) Date of Patent: Sep. 22, 2026

(54) VEHICLE CONTROL DEVICE

(71) Applicant: NISSAN NORTH AMERICA, INC., Franklin, TN (US)

(72) Inventors: Jorge Ignacio Ruiz Moreno, Toluca (MX); José Javier Payán Aguilar, Toluca (MX); Daniel Hernández Alamillo, Toluca (MX)

(73) Assignee: NISSAN NORTH AMERICA, INC., Franklin, TN (US)

( * ) Notice: Subject to any disclaimer, the term of this patent is extended or adjusted under 35 U.S.C. 154(b) by 298 days.

(21) Appl. No.: 18/429,011

(22) Filed: Jan. 31, 2024

(65) Prior Publication Data

US 2025/0242782 A1 Jul. 31, 2025

(51) Int. Cl.

| | |
|---|---|
| ***B60R 25/24*** | (2013.01) |
| ***B60R 25/01*** | (2013.01) |
| ***B60R 25/10*** | (2013.01) |
| ***B60R 25/102*** | (2013.01) |
| ***G07C 9/00*** | (2020.01) |

(52) U.S. Cl.

CPC ............ *B60R 25/245* (2013.01); *B60R 25/01* (2013.01); *B60R 25/102* (2013.01); *G07C 9/00309* (2013.01); *B60R 2025/1016* (2013.01); *B60R 2325/205* (2013.01); *G07C 2009/00793* (2013.01); *G07C 2209/63* (2013.01)

(58) Field of Classification Search

None

See application file for complete search history.

(56) References Cited

U.S. PATENT DOCUMENTS

| | | | | |
|---|---|---|---|---|
| 5,517,189 A * | 5/1996 | Bachhuber ......... | G07C 9/00182 375/345 |
| 7,224,980 B2 * | 5/2007 | Hara ....................... | B60R 25/24 455/161.3 |
| 7,471,187 B2 * | 12/2008 | Nakashima ........ | G07C 9/00309 340/12.51 |
| 7,609,146 B2 * | 10/2009 | Tang ....................... | G01S 11/06 340/5.72 |
| 7,978,049 B2 * | 7/2011 | Leitch ..................... | B60R 25/24 340/539.23 |
| 9,963,108 B2 | 5/2018 | Nishidai et al. | |
| 2015/0254913 A1 * | 9/2015 | Obata ...................... | G07C 9/30 340/5.72 |

(Continued)

*Primary Examiner* — Carlos Garcia

(74) *Attorney, Agent, or Firm* — Spencer Fane, LLP

(57) ABSTRACT

A vehicle control device has a vehicle body, a locking unit, an electronic signal transmission unit mounted on the vehicle body, and an electronic portable device in wireless communication with the electronic signal transmission unit. The electronic signal transmission unit detects a location of the electronic portable device with respect to the vehicle body. The electronic controller has a computer readable medium storing a threshold detection range between the electronic portable device and the vehicle body. The electronic controller is programmed to control the locking unit to be in the unlock permissible state when the electronic portable device is determined to be within the threshold detection range. The electronic controller is further programmed to automatically update the threshold detection range to a customized detection range upon determining that the locking unit is in an unintentional unlock permissible state.

20 Claims, 9 Drawing Sheets

(56) References Cited

U.S. PATENT DOCUMENTS

| | | | | |
|---|---|---|---|---|
| 2018/0236972 | A1* | 8/2018 | Linden | B60R 25/01 |
| 2019/0143942 | A1* | 5/2019 | Neuhoff | G07C 9/00309 340/5.72 |
| 2020/0169832 | A1* | 5/2020 | Kwon | B60R 25/245 |
| 2020/0226584 | A1* | 7/2020 | Nawoj | G06Q 20/127 |

* cited by examiner

VEHICLE CONTROL DEVICE

BACKGROUND

Technical Field

The present disclosure generally relates to a vehicle control device. More specifically, the present disclosure relates to a vehicle control device programmed to update a walk away lock and an automatic approach unlocking system boundary.

Background Information

A vehicle can be equipped with an auto walk away lock that is triggered if an electronic portable device such as a key or key fob moves away from the vehicle past a threshold distance while the vehicle is not being driven. The vehicle can be equipped with an automatic approach unlocking system that is triggered to unlock the vehicle if the electronic portable device is brought within a threshold distance of the vehicle.

SUMMARY

In view of the state of the known technology, one aspect of the present disclosure is to provide a vehicle control device having a vehicle body and a locking unit. The locking unit has a locked state, unlocked state and an unlock permissible state. The vehicle control device further comprises an electronic signal transmission unit mounted on the vehicle body. The vehicle control device further comprises an electronic portable device in wireless communication with the electronic signal transmission unit. The electronic signal transmission unit detects a location of the electronic portable device with respect to the vehicle body. The vehicle control device further comprises an electronic controller having a wireless communicator programmed to receive electronic signals transmitted by the electronic signal transmission unit regarding the location of the electronic portable device with respect to the vehicle body. The electronic controller further has a computer readable medium storing a threshold detection range between the electronic portable device and the vehicle body. The electronic controller is programmed to control the locking unit to be in the unlock permissible state when the electronic portable device is determined to be within the threshold detection range. The electronic controller further is programmed to automatically update the threshold detection range to a customized detection range upon determining that the locking unit is in an unintentional unlock permissible state.

BRIEF DESCRIPTION OF THE DRAWINGS

Referring now to the attached drawings which form a part of this original disclosure.

DETAILED DESCRIPTION OF EMBODIMENTS

Figure 1:
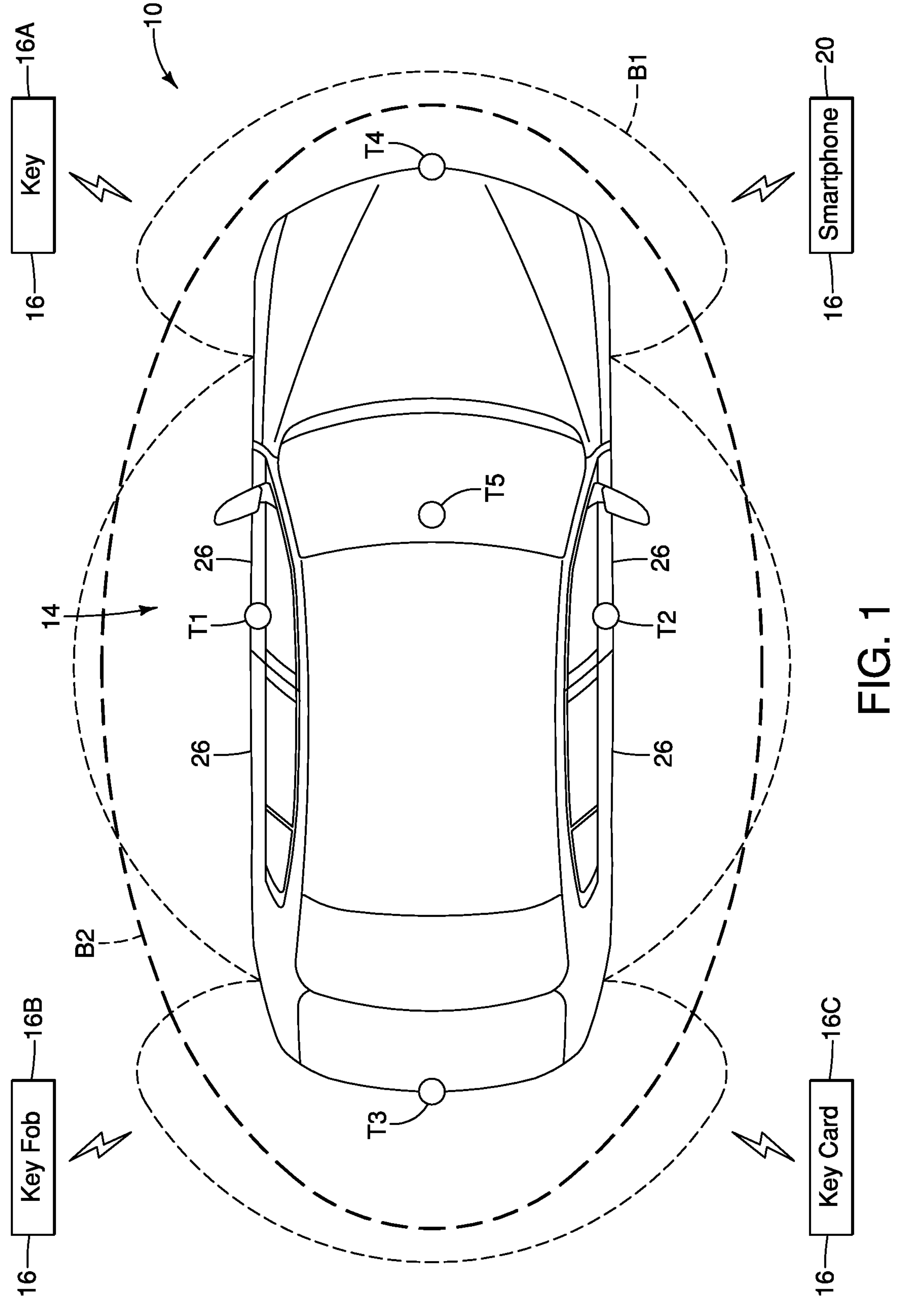
FIG. 1 is a schematic drawing of a vehicle equipped with a vehicle control device creating a customized boundary for an automatic locking unit in accordance with an illustrated embodiment.

Selected embodiments will now be explained with reference to the drawings. It will be apparent to those skilled in the art from this disclosure that the following descriptions of the embodiments are provided for illustration only and not for the purpose of limiting the invention as defined by the appended claims and their equivalents.

Referring initially to FIGS. 1 to 4, a vehicle control device 10 comprises a vehicle 12 and an electronic signal transmission unit 14. The vehicle control device 10 further comprises an electronic portable device 16 and an electronic controller 18. In the illustrated embodiment, the vehicle control device 10 further comprises a smartphone 20. The electronic signal transmission unit 14, the portable device 16 and the smartphone 20 are in wireless communication with a wireless communicator (illustrated as the transmitter and receiver of the vehicle in FIG. 3) of the electronic controller 18 as will be further described below.

Figure 2:
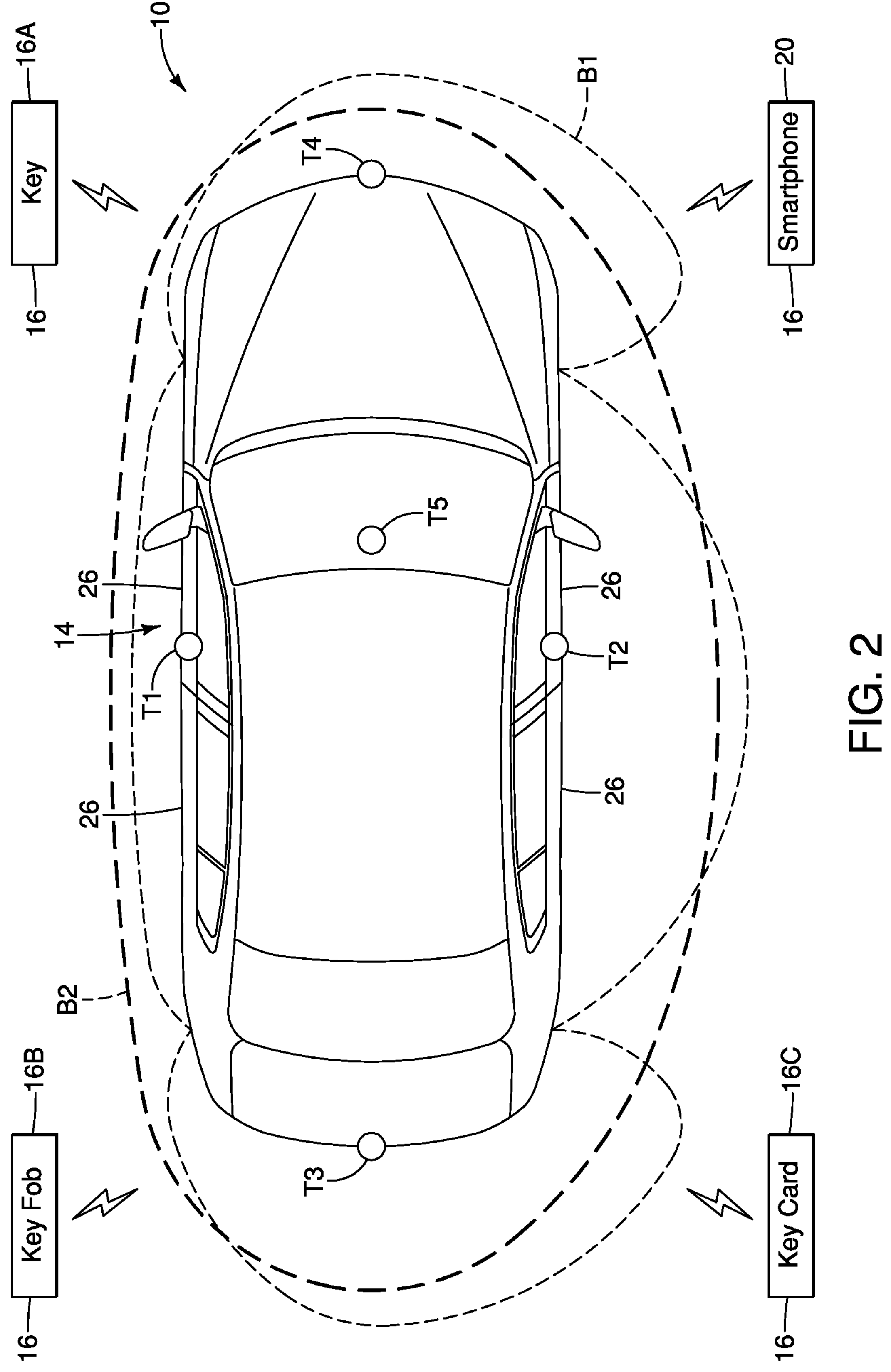
FIG. 2 is a schematic drawing similar to FIG. 1 but showing the customized boundary having an asymmetric shape.

As shown in FIGS. 1 and 2, the vehicle 12 has a vehicle body supporting a plurality of vehicle doors 26. The vehicle 12 further has a locking unit. The locking unit has a locked state, an unlocked state and an unlock permissible state. In the locked state, the vehicle doors 26 are locked. In the unlock state, the vehicle doors 26 are unlocked such that the vehicle doors 26 can be operated and opened by a user. In the unlock permissible state, the locking unit can be operated by the electronic portable device 16 between the locked and the unlocked states. In the unlock permissible state, the electronic portable device 16 is within the vicinity of the vehicle such that the electronic controller 18 can receive electronic control signals from the electronic portable device 16 regarding whether to lock or unlock the locking unit. In the illustrated embodiment, the unlock permissible state is a state in which the vehicle is capable of being unlocked or is unlocked. Therefore, the unlock permissible state includes the unlocked state.

In the illustrated embodiment, the electronic portable device 16 can include any one of a device that can operate the locking unit between the locked and the unlocked states. For example, the electronic portable device 16 can include any one of an electric key 16A, electric key fob 16B, and a key card 16C. Additionally, the electronic portable device 16 can also include the smartphone 20. In the illustrated embodiment, the smartphone 20 can be either a portable phone or a wearable electronic device (e.g., an electronic watch).

The locking unit can be a conventional locking unit for the vehicle doors 26 having an actuator that actuates a locking mechanism of the locking unit. The actuator can be connected to a door ECU such that the door ECU operates the actuator in response to a lock/unlock signal from the electronic portable device 16. The locking unit is part of an auto walk away lock (WAL) of the vehicle 12 that is triggered if the electronic portable device 16 moves away from the vehicle past a threshold distance (e.g., two meters). The locking unit of the illustrated embodiment is also part of the vehicle's automatic approach unlocking (APUL) which is triggered if the electronic portable device 16 is brought within a threshold distance of the vehicle (e.g., 1.5 meters). That is, the APUL is triggered when the portable device 16 is brought closer to the vehicle 12 or approaches the vehicle 12.

The threshold distance for automatic unlocking can also be used as a threshold distance for permissible unlocking in which the locking unit is operable by the electronic portable device 16 for unlocking. Therefore, in the illustrated embodiment, the threshold distance for automatic unlocking or automatic permissible unlocking can be considered a boundary for the locking unit. As shown in FIGS. 1, 2, 4 and 5, the electronic controller 18 of the illustrated embodiment is programmed to update a threshold boundary B1 to a customized boundary B2 upon determining that the locking unit is in an unintentional unlocked state as will be further described below.

Figure 3:
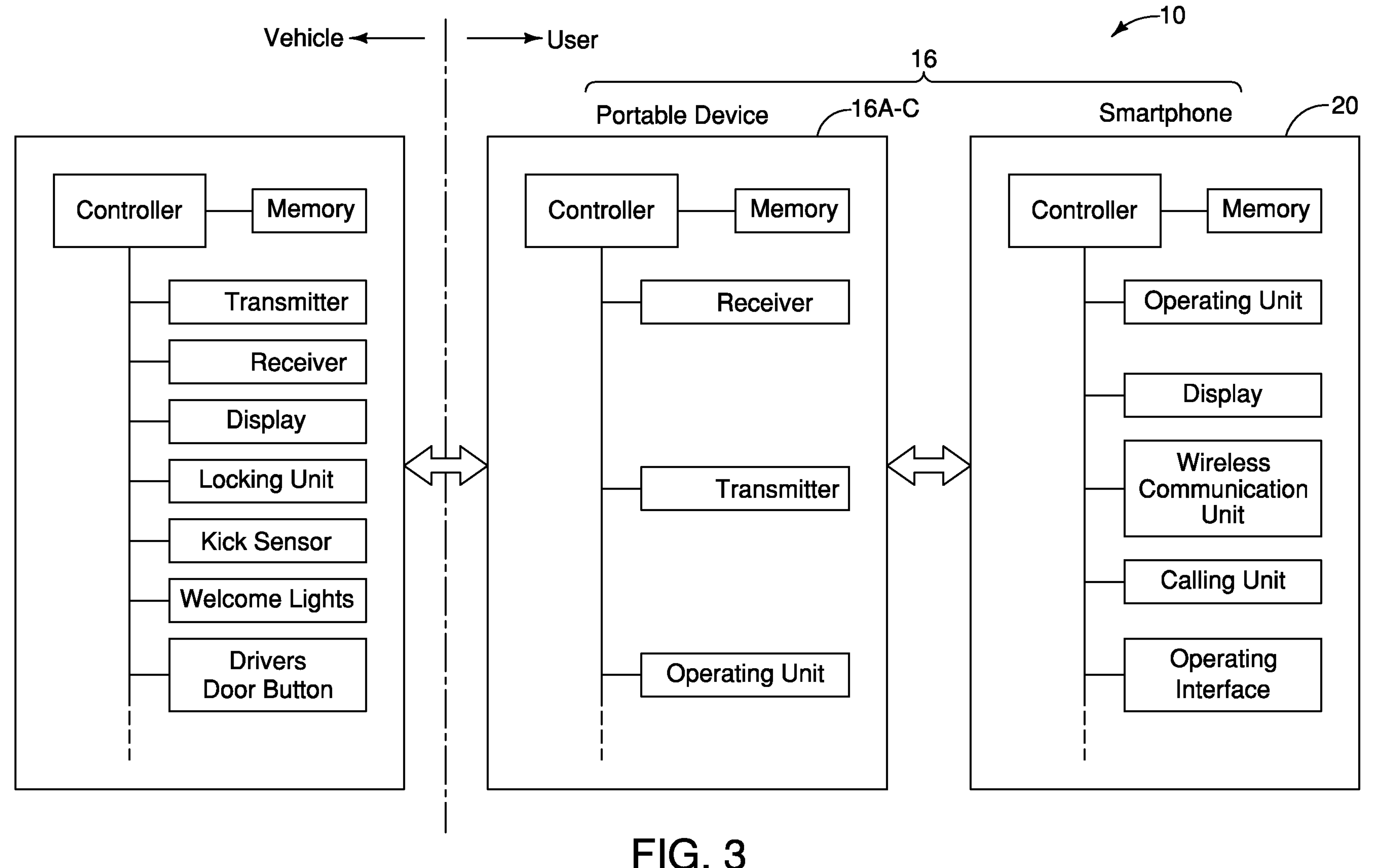
FIG. 3 is a block diagram of the vehicle control device.

As shown schematically in FIG. 3, the vehicle 12 is further equipped with door handles, one or more kick sensors provided to a rear hatch, etc., and welcome lights that can all be a part of the WAL/APUL system of the vehicle 12. That is, the vehicle 12 is equipped with a WAL/APUL that can automatically implement a customized boundary B2 using the electronic controller 18 as discussed herein. Additionally, the electronic controller 18 that implements the customized boundary B2 can be implemented with other systems that do not necessarily have to be integrated with the WAL/APUL system, such as the vehicle's welcome lights, door button, kick sensor, auto open button, unlatch button etc.

The door handles can be operable between locked and unlocked states by the unlock unit. In particular, the door handles can be equipped with an actuator (e.g., a drivers door button) such that when the 16 is within the threshold boundary B1, the door handle is operable to unlock the vehicle 12 as necessary. Alternatively, instead of using the actuator to unlock the door, the actuator/button of the vehicle 12 can automatically open the door. The actuator/button can also unlatch the door so a user can open the door.

The kick sensor can also be operable when the locking unit is in the unlock permissible state to open the rear hatch such that the doors 26 open when the kick sensor senses that the user has entered inside the boundary. The kick sensor can be equipped with a kick sensor button or operator in the rear hatch to open or release the rear hatch. The welcome lights can be triggered into the ON state when the locking unit is in the unlock permissible state. The welcome lights can be triggered when the 16 is detected to be within the boundary to indicate that the locking unit is in the unlock permissible state. As shown, the vehicle 12 is further equipped with a display D mounted in an interior of the vehicle body.

In the illustrated embodiment, the electronic controller 18 controls the locking unit between the locked, unlocked and unlock permissible states based on the location of the electronic portable device 16 with respect to the vehicle 12. The electronic controller 18 receives information on the location of the electronic portable device 16 with respect to the vehicle 12 based on signals transmitted by the electronic signal transmission unit 14 as will be further discussed below.

The electronic signal transmission unit 14 is capable of detecting the location of the electronic portable device 16 within a threshold detection range (hereinafter "threshold boundary B1") between the electronic portable device 16 and the vehicle body. The threshold boundary B1 is a threshold boundary B1 for determining whether the locking unit should be locked or unlocked based on the location of the electronic portable device 16. That is, the electronic signal transmission unit 14 is capable of detecting the electronic portable device 16 within the threshold boundary B1.

In the illustrated embodiment, the electronic controller 18 is programmed to automatically update the threshold boundary B1 to a customized detection range (hereinafter "customized boundary B2") upon determining that the locking unit is in an unintentional unlock state or unintentional unlock permissible state as will be further described below. The customized boundary B2 is an updated boundary for determining whether the locking unit should be locked or unlocked based on the location of the electronic portable device 16. Further, in the illustrated embodiment, the display D can be programmed to display notification messages to the user regarding the states of the locking unit and other information as will be further described below.

Referring to FIGS. 1 and 2, the electronic signal transmission unit 14 is mounted on the vehicle body. In particular, the electronic signal transmission unit 14 includes a plurality of antennas T1-T5 mounted on different locations of the vehicle body. For example, the electronic signal transmission unit 14 includes a first transmission antenna T1 that is located on a driver's seat-side pillar, a second transmission antenna T2 that is located on a passenger's seat-side pillar, a third transmission antenna T3 that is located on the rear end side. The electronic signal transmission unit 14 further includes a fourth transmission antenna T4 located on the front end side, and a fifth transmission antenna T5 located on the vehicle proof and so on. The electronic signal transmission unit 14 can include additional or alternatively transmission antennas T1-T5 located on various locations of the vehicle 12 as needed and/or desired.

The electronic signal transmission unit 14 is provided for detecting a location of the electronic portable device 16 with respect to the vehicle body. In particular, the transmission antennas T1-T5 transmit various signals to specify the position of the electronic portable device 16 by transmitting activation signals to activate the electronic portable device 16. The transmission antennas T1-T5 also transmit position detection signals (e.g., carrier waves) to detect the position of the electronic portable device 16 for specifying the position of the electronic portable device 16 based on whether or not the position detection signals have been successfully received by the electronic portable device 16.

The strength of the position detection signals transmitted between the transmission antennas T1-T5 and the electronic portable device 16 is based on whether the electronic portable device 16 is within the vicinity of the vehicle 12. The position detection signals are stronger when the electronic portable device 16 is moved closer to the vehicle 12 and the position detection signals are weaker as the electronic portable device 16 is moved further away from the vehicle 12.

For example, the first transmission antenna T1 can detect the position detection signals when the electronic portable device 16 is located in the vicinity of the driver's side vehicle door (e.g., approximately ten feet from the driver's side vehicle door). Similarly, the strength of position detection signals transmitted from the second transmission antenna T2 and the third transmission antenna T3 is such that the electronic portable device 16 can receive the position detection signals when the electronic portable device 16 is located in the vicinity (e.g., approximately ten feet distance) of the passenger's side door and in the vicinity of the vehicle rear end, respectively. Alternatively, the antennas T1-T5 can each transmit position signals to the portable device 16. The portable device 16 then transmits the strength of the transmitted signals received from the antennas T1-T5 to the electronic controller 18 so that the electronic controller 18 can determine the location of the portable device 16 with respect to the vehicle 12. Each of the transmission antennas T1-T5 can transmit signals using radio waves in the low frequency band (e.g., 125 kilohertz frequency). It will be apparent to those skilled in the vehicle field from this disclosure that the antennas T1-T5 can be other types of antennas that transmit position signals to detect the location of the portable device 16 with respect to the vehicle 12 as necessary.

As shown in FIG. 1, at full range, the transmission antennas T1-T5 can have a threshold boundary B1 that has an oval-like shape surrounding the vehicle 12 that illustrates the combined transmission strengths of each of the transmission antennas T1-T5. Therefore, the threshold boundary B1 determines the boundary for the WAL/APUL system such that the locking unit is in the locked state when the electronic portable device 16 is outside of the threshold boundary B1. The locking unit is in either of the unlocked state or the unlock permissible state when the electronic portable device 16 is within the threshold boundary B1.

Alternatively, the threshold boundary B1 can be based not on the electronic signal transmission unit 14. Rather, the threshold boundary B1 can be a preset boundary or imaginary boundary (e.g., five feet from the vehicle) that is prestored in the computer readable medium of the electronic controller 18. That is, the electronic portable device 16 can be located at a distance up to five feet distance from the vehicle 12 where the electronic portable device 16 can receive transmission signals from the antennas T1-T5. In other words, the electronic portable device 16 can be located up to five feet from the vehicle 13 such that the electronic portable device 16 is within the antenna range of the antennas T1-T5 or within the threshold boundary B1.

Figure 4:
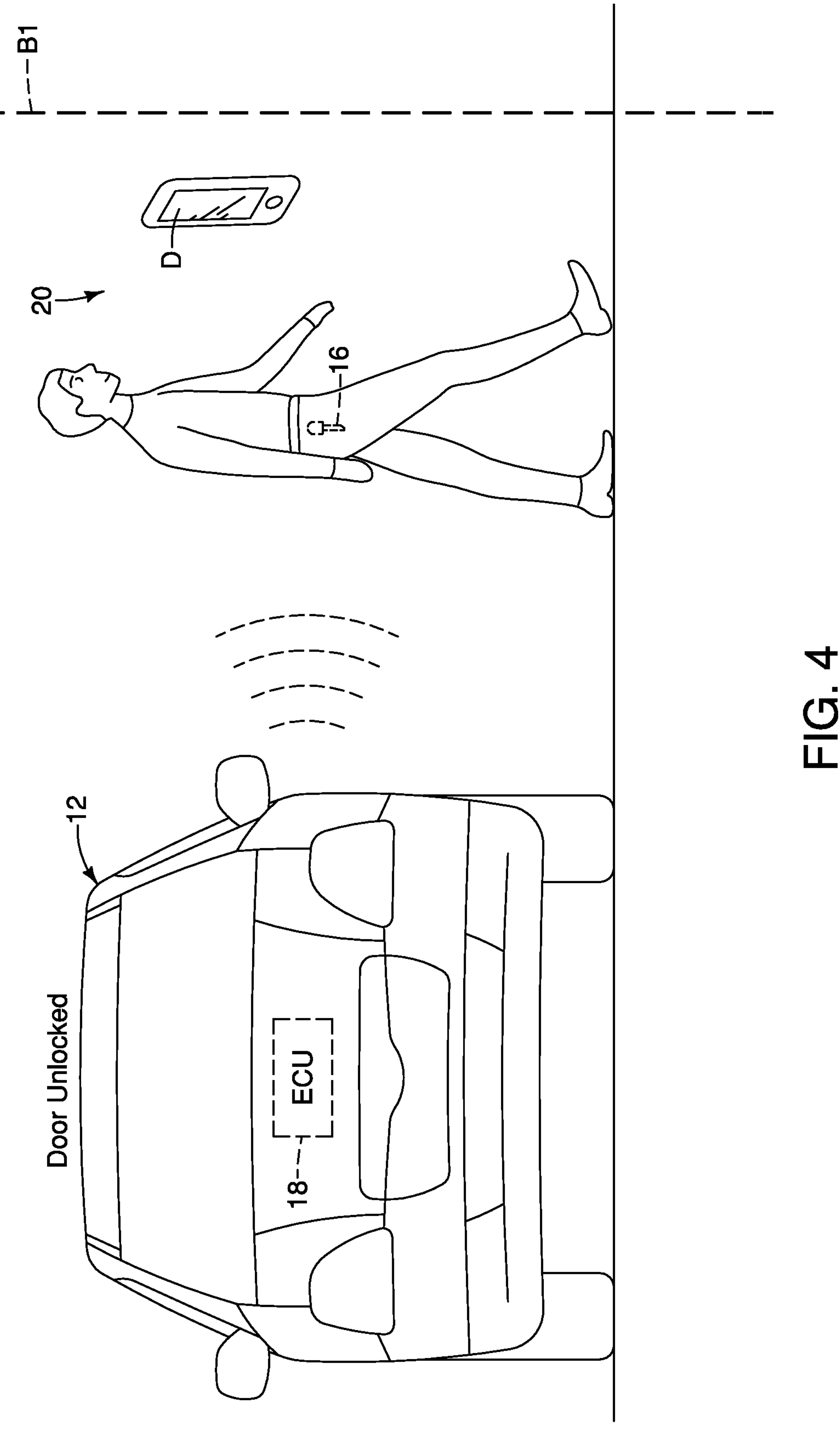
FIG. 4 is a schematic diagram of the vehicle equipped with the vehicle control device showing a user having a portable device within a threshold boundary for the locking unit.
Figure 5:
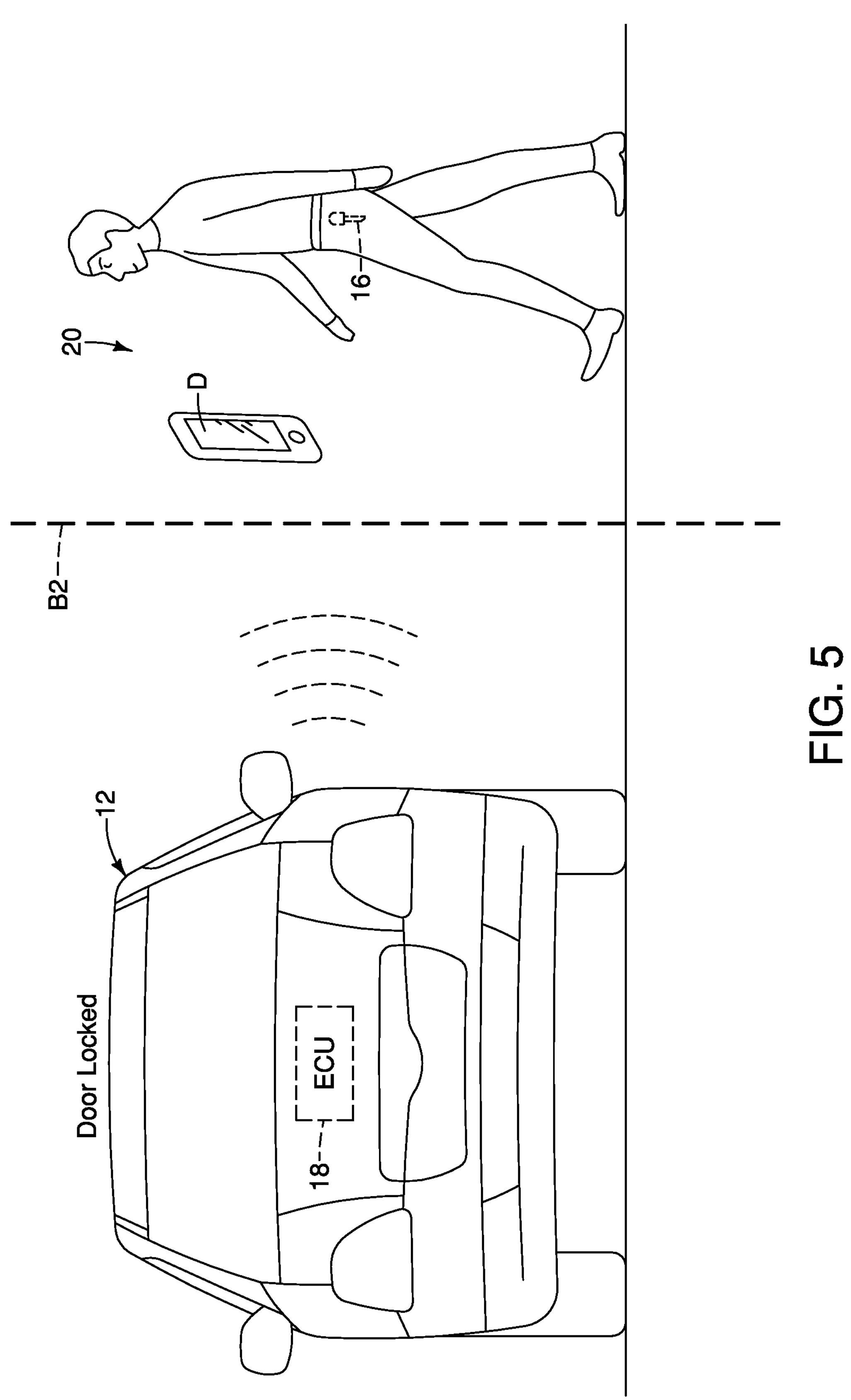
FIG. 5 is a schematic diagram similar to FIG. 4 but with the user and the portable device outside of a customized boundary for the locking unit.

Therefore, the strength of the position detection signals does not impact the range of the threshold boundary B1. In this example, the locking unit is in the locked state when the electronic portable device 16 is outside of the preset boundary (FIG. 4). The locking unit is in either of the unlocked state or the unlock permissible state when the electronic portable device 16 is within the preset boundary (FIG. 5).

As stated, the electronic portable device 16 can include either of the electronic key 16A, key fob 16B, an electronic card 16C or a smartphone 20. That is, the electronic portable device 16 includes any one of a group consisting of the electronic key 16A, the electronic key fob 16B, the electronic card 16C and the smartphone 20. As seen in FIG. 5, the vehicle control device 10 can be equipped with both the smartphone 20 and the electronic key/fob 16A/16B. The smartphone 20 includes a wireless communicator in wireless communication with the electronic signal transmission unit 14. The smartphone 20 further includes a display for displaying notification messages received from the electronic controller 18 as will be further described. As shown, the smartphone 20 includes a controller, a computer readable medium, an operating unit, the display, a wireless communicator along with other calling features.

The electronic controller 18 includes a processor or CPU that controls the operation of the vehicle control apparatus. The wireless communicator of the electronic controller 18 can include a low frequency (LF) transmitter that receives low frequency signals from the electronic transmission unit (antennas T1-T5) regarding the location of the electronic portable device 16. The wireless communicator can further include a receiver (e.g., an ultra high frequency receiver) that receives signals (e.g., ultra high signals) transmitted from the electronic portable device 16 to lock or unlock the locking unit. The exchange of signals between the electronic portable device 16 and the electronic controller 18 may be executed according to any protocol and transmission requirements.

As used herein, the terminology "processor" indicates one or more processors, such as one or more special purpose processors, one or more digital signal processors, one or more microprocessors, one or more controllers, one or more microcontrollers, one or more application processors, one or more Application Specific Integrated Circuits, one or more Application Specific Standard Products; one or more Field Programmable Gate Arrays, any other type or combination of integrated circuits, one or more state machines, or any combination thereof.

The term "wireless communicator" as used herein includes a receiver, a transmitter, a transceiver, a transmitter-receiver, and contemplates any device or devices, separate or combined, capable of transmitting and/or receiving wireless communication signals, including shift signals or control, command or other signals related to some function of the component being controlled. The wireless communication signals can be radio frequency (RF) signals, ultra-wide band communication signals, or Bluetooth communications or any other type of signal suitable for wireless communications as understood in the vehicle field.

The electronic controller 18 further has a computer readable medium storing the threshold boundary B1 (preset boundary) between the electronic portable device 16 and the vehicle body. As used herein, the terminology "memory" or "computer-readable medium" (also referred to as a processor-readable medium) indicates any computer-usable or computer-readable medium or device that can tangibly contain, store, communicate, or transport any signal or information that may be used by or in connection with any processor. For example, the computer-readable medium may be one or more read only memories (ROM), one or more random access memories (RAM), one or more registers, low power double data rate (LPDDR) memories, one or more cache memories, one or more semiconductor computer readable medium devices, one or more magnetic media, one or more optical media, one or more magneto-optical media, or any combination thereof.

Therefore, the computer-readable medium further includes any non-transitory (e.g., tangible) medium that participates in providing data (e.g., instructions) that may be read by a computer (e.g., by a processor of a computer). Such a medium may take many forms, including, but not limited to, non-volatile media and volatile media. Non-volatile media can include, for example, optical or magnetic disks and other persistent computer readable medium. Volatile media may include, for example, dynamic random access computer readable medium (DRAM), which typically constitutes a main computer readable medium.

The computer-readable medium can also be provided in the form of one or more solid state drives, one or more computer readable medium cards, one or more removable media, one or more read-only memories, one or more random access memories, one or more disks, including a hard disk, a floppy disk, an optical disk, a magnetic or optical card, or any type of non-transitory media suitable for storing electronic information, or any combination thereof.

The processor can execute instructions transmitted by one or more transmission media, including coaxial cables, copper wire and fiber optics, including the wires that comprise a system bus coupled to a processor of a computer. As used herein, the terminology "instructions" may include directions or expressions for performing any method, or any portion or portions thereof, disclosed herein, and may be realized in hardware, software, or any combination thereof.

For example, instructions may be implemented as information, such as a computer program, stored in computer readable medium that may be executed by a processor to perform any of the respective methods, algorithms, aspects, or combinations thereof, as described herein. In some embodiments, instructions, or a portion thereof, may be implemented as a special purpose processor, or circuitry, that may include specialized hardware for carrying out any of the methods, algorithms, aspects, or combinations thereof, as described herein. In some implementations, portions of the instructions may be distributed across multiple processors on a single device, on multiple devices, which may communicate directly or across a network such as a local area network, a wide area network, the Internet, or a combination thereof.

Computer-executable instructions can be compiled or interpreted from computer programs created using a variety of programming languages and/or technologies, including, without limitation, and either alone or in combination, Java™, C, C++, Visual Basic, Java Script, Perl, etc. In general, the processor receives instructions from the computer-readable medium and executes these instructions, thereby performing one or more processes, including one or more of the processes described herein. Such instructions and other data may be stored and transmitted using a variety of computer-readable media.

The electronic controller 18 is programmed to control the locking unit to be in the unlock permissible state when the electronic portable device 16 is determined to be within the threshold boundary B1. As stated, the electronic controller 18 is programmed to automatically update the threshold boundary B1 to the customized boundary B2 upon determining that the locking unit is in an unintentional unlock permissible state. In particular, the electronic controller 18 is programmed to determine that the locking unit is in the unintentional unlock permissible state upon determining that the locking unit is in the unlock permissible state while being stationary for a threshold period of time. The electronic controller 18 is programmed to determine the customized boundary B2 based on the location of the electronic portable device 16 such that the electronic portable device 16 is not within the customized boundary B2 after updating.

Figure 6:
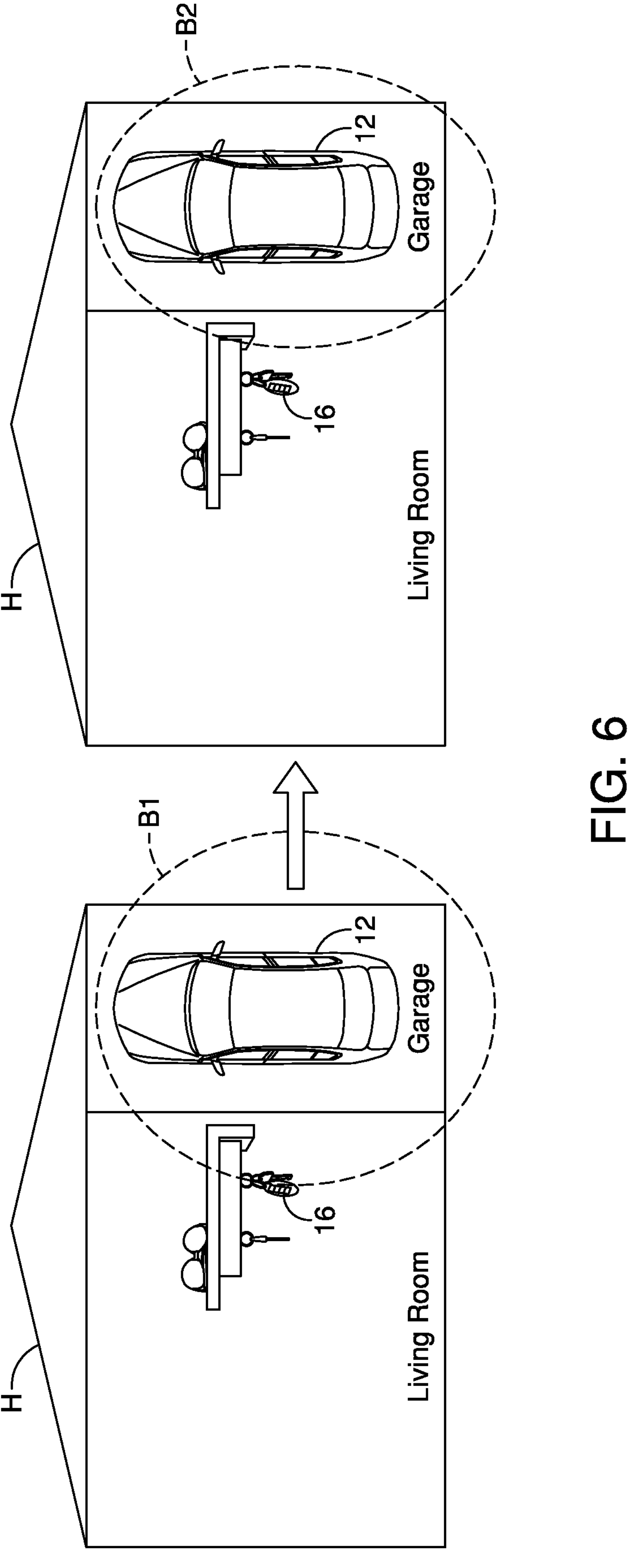
FIG. 6 is a schematic diagram of the vehicle parked at a home location having a threshold boundary for the locking unit and being updated to a customized boundary.
Figure 7:
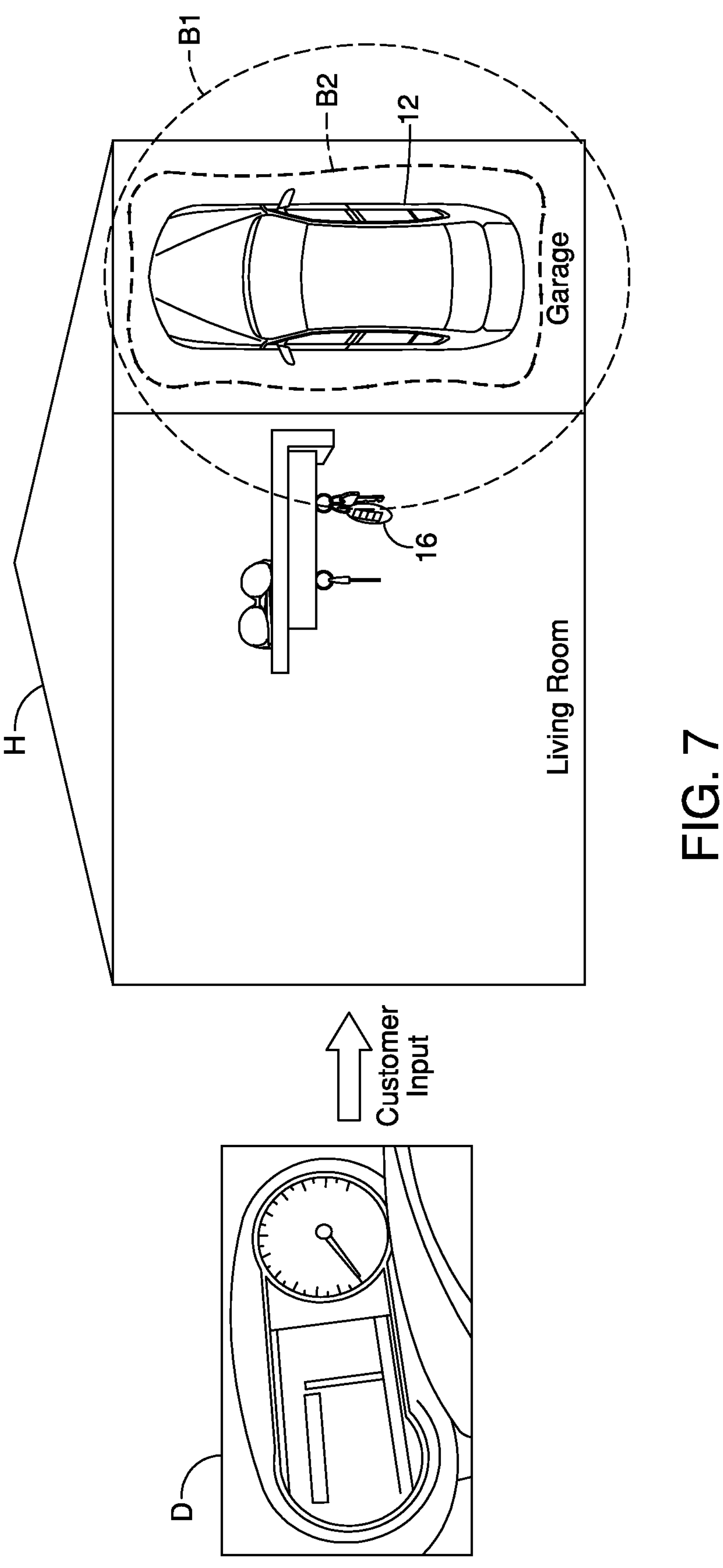
FIG. 7 is another schematic diagram of the vehicle parked at a home location having an asymmetric shaped customized boundary.

The computer readable medium of the electronic controller 18 stores a preset time threshold (e.g., ten minutes) for determining whether the locking unit is in an unintentional unlocked state. That is, the electronic controller 18 determines that the locking unit is in the unintentional unlocked state when the locking unit is left unlocked for a predetermined period of time. In many congested communities, a vehicle can be parked near a user's home H with the electronic operating device still within the threshold boundary B1 of the as shown in FIGS. 6 and 7. In this condition, the locking unit can be left in a prolonged unintentional unlocked state due to the electronic operating device being kept within the vicinity of the vehicle overnight.

Therefore, the electronic controller 18 is provided to control the locking unit into the locked state upon updating the threshold boundary B1 to the customized boundary B2 after the threshold period of time. As shown in FIGS. 6 and 7, the customized boundary B2 has a smaller maximum total area than the original threshold boundary B1. In this way, the electronic operating device is no longer within the threshold boundary B1 that would cause the locking unit to be left in the unintentional unlocked state. Therefore, a maximum area of the customized boundary B2 is less than a maximum area of the threshold boundary B1. As shown, the threshold boundary B1 and the customized boundary B2 will always include the vehicle itself. As stated, the electronic controller 18 is further programmed to control the locking unit into the locked state upon updating the threshold boundary B1 to the customized boundary B2 after the threshold period of time. That is, the locking unit is automatically locked after the predetermined time period (e.g., ten minutes) has passed.

Typically for congested communities, the condition of vehicles being left in unintentional unlocked states occurs when the user or driver is at home H. Therefore, the vehicle control device 10 of the illustrated is provided to control the display D (either the display of the vehicle or the display of the smartphone 20) to display a notification message requesting the driver to confirm a home H location for the vehicle. The display D can be an electronic display having a touchscreen provided to either the vehicle 12 or to the smartphone 20. In the illustrated embodiment, the home H location is considered the location where the vehicle is located when the driver goes to sleep.

In the illustrated embodiment, the computer readable medium can store a preset threshold time for home H that is different from other locations. For example, in public (e.g., where the vehicle is parked near a restaurant or a store), the electronic controller 18 can change the threshold boundary B1 to the customized boundary B2 based on a preset time threshold that is different than the time threshold for when the vehicle 12 is at home H (e.g., five minutes in public versus ten minutes at home H). That is, the computer readable medium can store various preset time thresholds for whether the vehicle is determined to be at home H or not at home H.

Therefore, in the illustrated embodiment, the threshold boundary B1 can further include a first threshold and a second threshold. The first threshold is a home range when the vehicle is located at home H and the second threshold being a non-home range when the vehicle is not located at home H. The home range and the non-home range are different. That is, the electronic controller 18 can set different threshold boundaries for whether the vehicle 12 is at home H or not. That is, the memory of the electronic controller 18 can store different threshold boundaries for whether the vehicle 12 is at home H or not. For example, the computer readable medium can have a prestored threshold boundary B1 of five (5) feet from the vehicle 12 on all sides for when the vehicle 12 is determined to be at home H. The computer readable medium can have a prestored threshold boundary B1 of ten (10) feet from the vehicle on all sides for when the vehicle 12 is determined to be not at home H (i.e., in public).

Figure 8:
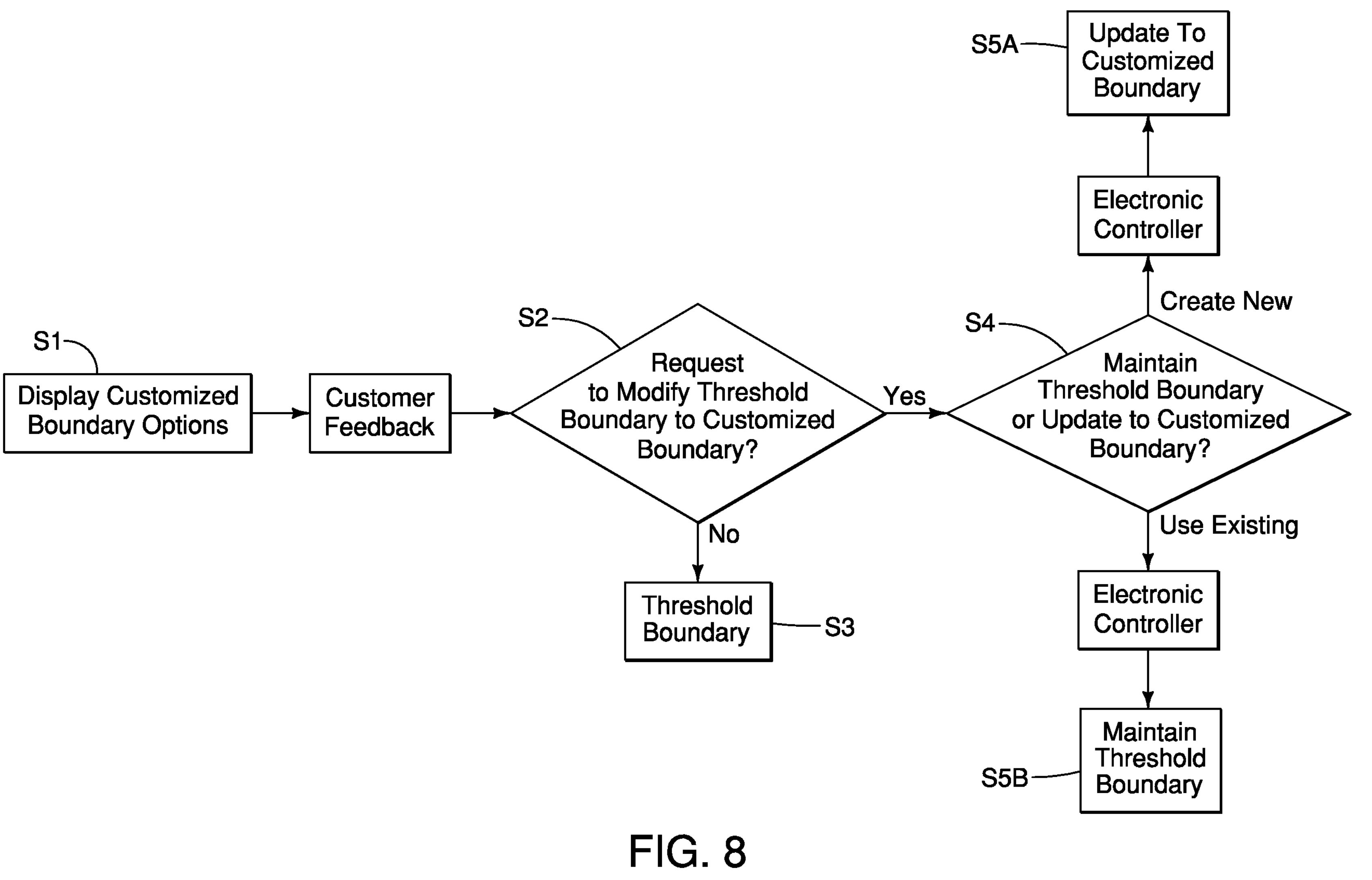
FIG. 8 is a flowchart of operating steps of the vehicle control device during use by the user.

As shown in FIGS. 2 and 8, the electronic controller 18 is programmed to selectively control the plurality of antennas T1-T5 to update the customized boundary B2. In this way, the electronic controller 18 can create a customized boundary B2 that is irregular or asymmetric in shape by selectively controlling the antennas T1-T5. That is, the electronic controller 18 can control any one of the antennas T1-T5 to transmit LF signals at a lower frequency to decrease the area of the customized boundary B2. For example, as shown in FIG. 2, the electronic controller 18 is selectively controlling the first transmission antenna to transmit signals at a lower frequency and range to decrease the boundary region near the driver's side door only while the other antennas T1-T5 are unaffected. Therefore, the customized boundary B2 shown in FIGS. 2 and 7 is asymmetric as the electronic controller 18 can selectively control the antennas T1-T5 to alter the signal transmissions of the antennas T1-T5 in order to set the customized boundary B2 to have an irregular shape as desired.

Additionally, as previously described, the electronic controller 18 can be stored with preset imaginary boundaries that are not based on the strength of the antennas T1-T5. The electronic controller 18 can then modify the boundaries B1 and B2 based on prestored boundaries stored in the memory.

Figure 9:
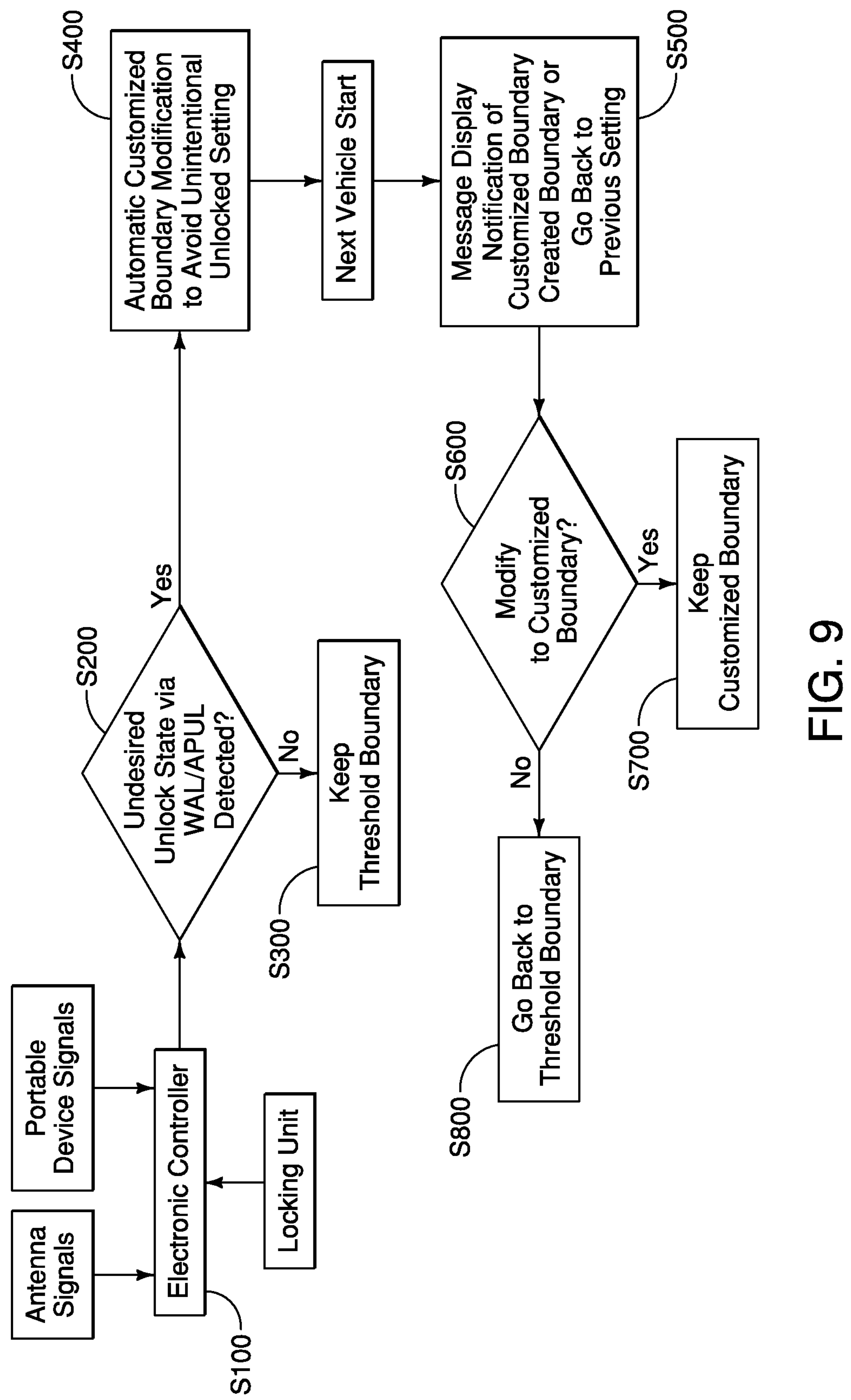
FIG. 9 is a flowchart of operating steps of the vehicle control device updating a threshold boundary to a customized boundary for the locking unit.

Referring to FIGS. 8 and 9, the electronic controller 18 is further programmed to control the display D to display a notification message regarding the threshold boundary B1 being updated to the customized boundary B2 upon determining a next instance of the vehicle starting. Therefore, the smartphone 20 is in wireless communication with the wireless communicator of the electronic controller 18 to receive a notification message regarding the threshold boundary B1 being updated to the customized boundary B2 upon determining a next instance of the vehicle starting. As stated, the notification message can also be displayed on the display D of the vehicle 12.

For example, as shown in FIG. 8, the display D can display a human-machine interphase menu to ask a user whether to allow for customization of the threshold boundary B1 to a customized boundary B2 in step S1. The user can input a request to modify the threshold boundary B1 in step S2. If the user selects no, the current threshold boundary B1 will be maintained in step S3. If the user selects yes, the display D can display a message asking the user whether he/she wants to maintain the current threshold boundary B1 or to customize to a customized boundary B2 in step S4. The electronic controller 18 will then set the boundary accordingly in steps S5A and S5B.

Referring to FIG. 9, a flowchart illustrating the steps of the electronic controller 18 of the vehicle control device 10 is illustrated. As shown, the electronic controller 18 receives signals transmitted by the antennas T1-T5 in step S100. The electronic controller 18 also receives signals transmitted by the electronic portable device 16 regarding the location of the electronic portable device 16 in step S100. The electronic controller 18 also receives signals from the locking unit regarding whether the locking unit is in a locked, unlocked or unlock permissible state in step S100. Based on the received information, the electronic controller 18 can determine whether the locking unit is in the intentional unlocked state because the locking unit is left in close vicinity to the vehicle 12 for a prolonged period of time in step S200. Step S200 can also include the scenario where the electronic portable device 16 is outside of the vehicle 12 but still within the boundary B1.

If no, the electronic controller 18 can maintain the threshold boundary B1 in step S300. If yes, the electronic controller 18 can update the threshold boundary B1 to the customized boundary B2 in step S400. In the next vehicle start, the electronic controller 18 can control the display to display that a customized boundary B2 was created in step S600. The display can provide the user with the option to confirm whether the customized boundary B2 should be maintained in step S500. The electronic controller 18 then determines whether to maintain the customized boundary B2 or to revert back to the threshold boundary B1 based on the user feedback in step S600. The electronic controller 18 then updates or maintains the boundary accordingly in steps S700 and S800.

In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also, the terms "part," "section," "portion," "member" or "element" when used in the singular can have the dual meaning of a single part or a plurality of parts. Also as used herein to describe the above embodiment (s), the following directional terms "forward", "rearward", "above", "downward", "vertical", "horizontal", "below" and "transverse" as well as any other similar directional terms refer to those directions of a vehicle equipped with the vehicle control device. Accordingly, these terms, as utilized to describe the present invention should be interpreted relative to a vehicle equipped with the vehicle control device.

The term "detect" as used herein to describe an operation or function carried out by a component, a section, a device or the like includes a component, a section, a device or the like that does not require physical detection, but rather includes determining, measuring, modeling, predicting or computing or the like to carry out the operation or function.

The term "configured" as used herein to describe a component, section or part of a device includes hardware and/or software that is constructed and/or programmed to carry out the desired function.

While only selected embodiments have been chosen to illustrate the present invention, it will be apparent to those skilled in the art from this disclosure that various changes and modifications can be made herein without departing from the scope of the invention as defined in the appended claims. For example, the size, shape, location or orientation of the various components can be changed as needed and/or desired. Components that are shown directly connected or contacting each other can have intermediate structures disposed between them. The functions of one element can be performed by two, and vice versa. The structures and functions of one embodiment can be adopted in another embodiment. It is not necessary for all advantages to be present in a particular embodiment at the same time. Every feature which is unique from the prior art, alone or in combination with other features, also should be considered a separate description of further inventions by the applicant, including the structural and/or functional concepts embodied by such feature(s). Thus, the foregoing descriptions of the embodiments according to the present invention are provided for illustration only, and not for the purpose of limiting the invention as defined by the appended claims and their equivalents.

What is claimed is:

1. A vehicle control device comprising:

a vehicle having a vehicle body and a locking unit having a locked state, and an unlock permissible state, the vehicle being locked when the locking unit is in the locked state, the unlock permissible state being a state in which the vehicle is capable of being unlocked or is unlocked;

an electronic signal transmission unit mounted on the vehicle body;

an electronic portable device in wireless communication with the electronic signal transmission unit, the electronic signal transmission unit detecting a location of the electronic portable device with respect to the vehicle body; and an electronic controller having a wireless communicator programmed to receive electronic signals transmitted by the electronic signal transmission unit regarding the location of the electronic portable device with respect to the vehicle body, the electronic controller further having a computer readable medium storing a threshold detection range between the electronic portable device and the vehicle body, the electronic controller being programmed to control the locking unit to be in the unlock permissible state when the electronic portable device is determined to be within the threshold detection range, the electronic controller being further programmed to automatically update the threshold detection range to a customized detection range upon determining that the locking unit is in an unintentional unlock permissible state and has been within the threshold detection range for a threshold period of time.

2. The vehicle control device according to claim 1, wherein the electronic controller is further programmed to control the locking unit into the locked state upon updating the threshold detection range to the customized detection range after the threshold period of time.

3. The vehicle control device according to claim 1, further comprising a display mounted in an interior of the vehicle body, the electronic controller being further programmed to control the display to display a notification message regarding the threshold detection range being updated to the customized detection range upon determining a next instance of the vehicle starting.

4. The vehicle control device according to claim 1, further comprising a smartphone in wireless communication with the wireless communicator of the electronic controller to receive a notification message regarding the threshold detection range being updated to the customized detection range.

5. The vehicle control device according to claim 1, wherein the electronic portable device includes any one of a group consisting of an electronic key, a key fob, a smartphone and an electronic card.

6. The vehicle control device according to claim 1, wherein the electronic signal transmission unit includes a plurality of antennas mounted on different locations of the vehicle body.

7. The vehicle control device according to claim 1, wherein the electronic controller is programmed to determine the customized detection range based on the location of the electronic portable device such that the electronic portable device is not within the customized detection range.

8. The vehicle control device according to claim 7, wherein the electronic controller is programmed to control the locking unit into the locked state after determining the customized detection range.

9. The vehicle control device according to claim 6, wherein the electronic controller is programmed to selectively control the plurality of antennas to update the customized detection range.

10. The vehicle control device according to claim 1, wherein the electronic controller is programmed to determine that the electronic portable device is within the threshold detection range and update to the customized detection range such that the electronic portable device is outside of the customized detection range.

11. The vehicle control device according to claim 1, wherein a maximum area of the customized detection range is less than a maximum area of the threshold detection range.

12. The vehicle control device according to claim 1, wherein the threshold detection range includes a first threshold and a second threshold, the first threshold being a home range when the vehicle is located at home and the second threshold being a non-home range when the vehicle is not located at home, the home range and the non-home range being different.

13. The vehicle control device according to claim 1, wherein the electronic controller is programmed to determine that the locking unit is in the unintentional unlock permissible state upon determining that the locking unit is in the unlock permissible state for a threshold period of time.

14. The vehicle control device according to claim 13, wherein the electronic controller is further programmed to control the locking unit into the locked state upon updating the threshold detection range to the customized detection range after the threshold period of time.

15. The vehicle control device according to claim 1, wherein the electronic portable device includes a smartphone configured to receive a notification message regarding the threshold detection range being updated to the customized detection range.

16. The vehicle control device according to claim 1, wherein the electronic controller is configured to store a plurality of threshold periods of time for different locations.

17. The vehicle control device according to claim 16, wherein the electronic controller determines which of the plurality of threshold periods of time to apply as the threshold period of time based on whether the vehicle is parked at a home location.

18. The vehicle control device according to claim 12, wherein the non-home range is larger than the home range.

19. The vehicle control device according to claim 6, wherein the electronic controller is configured to adjust a frequency or detection range of one or more of the plurality of antennas while leaving one or more of the plurality of antennas unaffected when updating the threshold detection range to the customized detection range.

20. The vehicle control device according to claim 1, wherein the customized detection range is larger on one side of the vehicle than on an opposite side.

* * * * *